(12) United States Patent
Tan et al.

(10) Patent No.: US 11,513,937 B2
(45) Date of Patent: Nov. 29, 2022

(54) METHOD AND DEVICE OF DISPLAYING VIDEO COMMENTS, COMPUTING DEVICE, AND READABLE STORAGE MEDIUM

(71) Applicant: Shanghai Bilibili Technology Co., LTD., Shanghai (CN)

(72) Inventors: Zhaoxin Tan, Shanghai (CN); Jingqiang Zhang, Shanghai (CN); Qi Tang, Shanghai (CN); Jianqiang Ding, Shanghai (CN); Hao Liu, Shanghai (CN)

(73) Assignee: Shanghai Bilibili Technology Co., LTD., Shanghai (CN)

( * ) Notice: Subject to any disclaimer, the term of this patent is extended or adjusted under 35 U.S.C. 154(b) by 0 days.

(21) Appl. No.: 16/904,948

(22) Filed: Jun. 18, 2020

(65) Prior Publication Data

US 2020/0401496 A1 Dec. 24, 2020

(30) Foreign Application Priority Data

Jun. 19, 2019 (CN) .......................... 201910532367.0
Jun. 19, 2019 (CN) .......................... 201910532491.7

(51) Int. Cl.
*G06F 11/34* (2006.01)
*G06F 16/957* (2019.01)

(52) U.S. Cl.
CPC ...... *G06F 11/3419* (2013.01); *G06F 11/3452* (2013.01); *G06F 11/3466* (2013.01); *G06F 16/9577* (2019.01)

(58) Field of Classification Search
CPC ............. G06F 16/9577; G06F 11/3466; G06F 11/3452; G06F 11/3419; G06F 2201/81; H04N 21/4782; H04N 21/488

USPC ....................................................... 702/182
See application file for complete search history.

(56) References Cited

U.S. PATENT DOCUMENTS

2013/0024544 A1* 1/2013 Oshita .................... G06Q 10/00
709/217
2015/0092106 A1* 4/2015 Savare ............... H04N 21/8358
348/512

FOREIGN PATENT DOCUMENTS

| CN | 104123210 A | * 10/2014 |
| CN | 105898348 A | * 8/2016 |
| CN | 106210853 A | 12/2016 |
| CN | 106254922 A | 12/2016 |
| CN | 108462893 A | 8/2018 |

(Continued)

OTHER PUBLICATIONS

Bai et al.; "The Influence of Subculture on the Business Model of Video Websites-A Case Analysis of Bilibili"; Journalism & Communication Review; vol. 71 No. 6; Nov. 2018; p. 82-92 (English Abstract see p. 92).

*Primary Examiner* — John H Le
(74) *Attorney, Agent, or Firm* — BakerHostetler

(57) ABSTRACT

Techniques of displaying comments relative to video frames are described herein. The disclosed techniques include obtaining page data comprising a video file and rendering the page data to play a video comprising a plurality of frames; obtaining a comment file comprising a plurality of comments on the video; displaying the plurality of comments relative to the plurality of frames while playing the video; detecting a computer performance parameter during rendering the page data; and reducing a density of displaying comments in response to determining that the computer performance parameter is less than a predetermined value.

16 Claims, 12 Drawing Sheets

(56) References Cited

FOREIGN PATENT DOCUMENTS

| | | |
|---|---|---|
| CN | 109151966 A | 1/2019 |
| CN | 109302619 A | 2/2019 |
| JP | 2018-165880 A | 10/2018 |
| WO | WO 2017/071523 A1 | 5/2017 |

* cited by examiner stopping displaying comment contents after time Tx when (S1+S2+...Sm)/T is less than the default value is detected — Step 1101

METHOD AND DEVICE OF DISPLAYING VIDEO COMMENTS, COMPUTING DEVICE, AND READABLE STORAGE MEDIUM

CROSS-REFERENCE TO RELATED APPLICATION

The present application claims priority of Chinese patent application Nos. 201910532491.7, filed on Jun. 19, 2019, and 201910532367.0, filed on Jun. 19, 2019. The entire disclosure of the above-identified application is hereby incorporated by reference herein and made a part of this specification.

BACKGROUND

With rapid developments of the Internet and smart terminals, more and more users play video files through smart terminals, comments display is a phenomenon that a large number of comments in a form of subtitles are shown in the same picture with video when watching. A large number of comments floated over the top of the video are like dense shells, so it's named comments. The comments are presented on the video in real time with playing the video, so that a viewer can see the comments sent by other viewers and himself when watching the video, which improves the user experience.

BRIEF DESCRIPTION OF THE DRAWINGS

By reading the detailed description of the preferred embodiments below, various other advantages and benefits become clear to an ordinary technical person in the field. The drawings are only for a purpose of showing the preferred embodiments and are not considered as a limitation of the present application. And in the whole drawings, the same part is represented as the same reference symbol. In the drawings.

DETAILED DESCRIPTION OF ILLUSTRATIVE EMBODIMENTS

Figure 1:
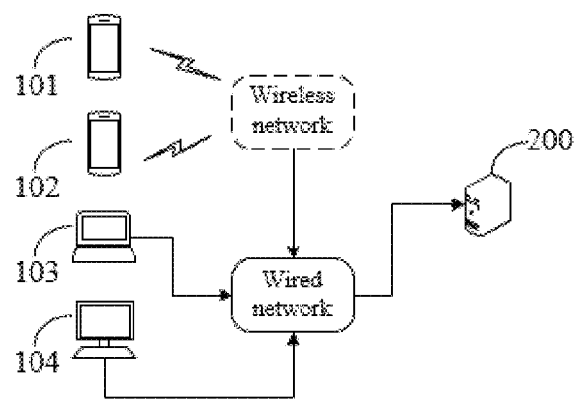
FIG. 1 is a communication network system diagram of a method of displaying video comments of an embodiment 1.

The advantages of the present application are further described below in combination with the drawings and specific embodiments.

The exemplary embodiment will be described in detail here, and its examples are shown in the drawings. When the following description relates to the drawings, unless otherwise indicated, the same number in different figures represents the same or the similar element. The embodiments described at below do not represent all embodiments consistent with the present application. On the contrary, they are only examples of device and method which are consistent with some aspects of the present application as detailed in claims.

Terms used herein in the present disclosure is for a purpose of describing particular embodiments and is not intended to limit the present disclosure. Singular forms "a", "one" and "the" in the present disclosure and the claims are meant to include the majority of forms, unless the context clearly indicates other situations. It should be further understood that, terms "and/or" used in the present disclosure refers to and includes any combination and all possible combinations of one or more associated listed items.

It should be understood that although terms first, second, third, and so on may be used in the disclosure to describe various information, but the information should not be limited to these terms. These terms are used only to distinguish information of the same type from each other. For example, without departing from the scope of the present disclosure, first information may also be named as second information, similarly, the second information may also be named as the first information. Depending on the context, a word "if" used here can be interpreted as "at the time" or "when" or "in response to, determine".

In the description of the present application, it should be understood that the number label in front of a step does not identify a sequence of executing the step, but it is only used to conveniently describe the present application and distinguish each step, so it can not be understood as a limitation of the present application.

A video in the embodiments of the present application can be played in a large video playing device, a game machine, a desktop computer, a smartphone, a tablet computer, an MP3 (Moving Picture Experts Group Audio Layer III)

player, an MP4 (Moving Picture Experts Group Audio Layer LV) player, a laptop Computer, an e-book reader and other display terminals.

In an embodiment of the present application, after a user inputs comment contents and the comment contents are processed by a server, can be sent by the server to each client (that is, viewing end or client end), each client plays video contents and corresponding comment contents. Please refer to FIG. 1, which is a system architecture diagram of a method of playing video comments provided by an embodiment of the present application. As shown in FIG. 1, a user 101 transmits video comment contents to a server 200 via wireless network or wired network, the user 101 and the user 102 watch the video comment contents of the user 101 via the wireless network, a user 103 and a user 104 watch the video comment contents of user 101 via the wired network and transmit respective comment information to the server 200. Only the server 200 is shown here, and a scenario here can also include multiple servers which are communicating with each other. The server 200 can be a cloud server or a local server. In an embodiment of the present application, the server 200 is placed on the cloud side. If the user 101 sends comment information, a server W processes the comment information and forwards the comment information to the user 101, the user 102, the user 103 and the user 104.

Compared to the conventional video playing, the comments are displayed while the video is playing, which not only provides the user experience, but also increases the resource consumption of the computer. Because it is necessary to render and display a lot of comment contents, especially when the number of comments is very large, the normal video playing process will be affected, and even the working performance of the computer will also be affected, so that the comments playing is stuck, which affects the stability of video playing and comment display. Furthermore, a lot of comments may cover video pictures. An anti-covering comment is to make the comment hiding temporarily when passing through a main area of the video picture, so as to realize a visual effect that the comment "passes behind" characters in the picture, and ensure that a main content area of a video picture is not covered by the comments. In order to solve a defect of sticking and poor stability in the existing video comment playing, a method of playing video comments is provided. The present disclosure describes techniques of optimizing comment display process according to the computer performance status, and improve stability of an anti-covering comment display using mask frames.

It is applied to a client, wherein the client is an smart terminal of a user, and the smart terminal can implement the method in various forms. For example, the terminals described in the present application may include mobile terminals such as mobile phones, tablets, laptops, palmtops, personal digital assistants, portable media players, and fixed terminals such as digital TVs, desktops, and so on. In the subsequent description, a fixed terminal is described as an example. It is understood by a technical personnel in the field that, in addition to the elements specially used for mobile purposes, a configuration according to the embodiments of the present application can also be applied to fixed type terminals.

Figure 2:
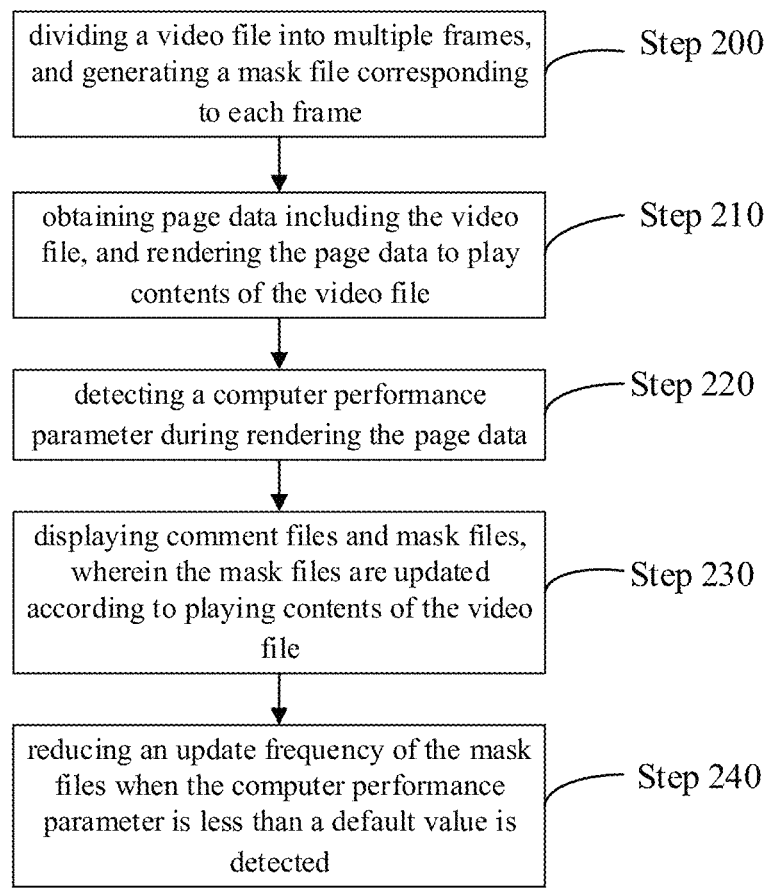
FIG. 2 is a flowchart of a method of displaying video comments of the embodiment 1.

Wherein, the server can be a single server device, a server cluster or a part of a virtual host area configured in a single server. Referring to FIG. 2, it is a flowchart of a method of playing video comments in accordance with a preferred embodiment of the present application. It can be seen from the figure that the method of playing video comments provided in this embodiment mainly includes the following steps:

Step S200, dividing a video file into multiple frames, and generating a mask frame corresponding to each frame of the video;

Step S210, obtaining page data including the video file, and rendering the page data to play contents of the video file;

Step S220, detecting a computer performance parameter during rendering the page data; Step S230, displaying comments and mask frames, wherein the mask frames are updated according to playing contents of the video file;

Step S240, reducing an update frequency of the mask frames when the computer performance parameter is less than a default value is detected.

Wherein, the video file is contained in the page data of a webpage, after the client obtains the page data from the server, the page data is analyzed according to a protocol supported by a browser, and then the page data is rendered so as to play contents of the video file.

For the video file, when the video file are analyzed for rendering and playing, a playing process at least includes a video file data receiving process, an analyzing process, a decoding process and an outputting process.

Wherein, the video file data receiving is receiving, obtaining and getting video file data stream sent from a data source. There are many sources of the data source, such as a hard disk or an external storage device of the smart terminal, or a server connected through network. Interfaces of different data sources are unified, the video file from different sources obtained through different protocols and data analyzers are processed by player.

Wherein, video file data analysis, also known as de-multiplexing, is to divide a video and an audio from their combination, the video is encoded independently when it is produced, and data obtained is separated, for a convenience of transmission, the video and the audio are combined in a certain way, that is, corresponding to different envelopsulation formats, the de-multiplexing is to decompose audio streams and video streams and send them to an audio decoder and a video decoder respectively for decoding operations.

Wherein, a video file data decoding includes an audio decoding and a video decoding, for the convenience of transmission, the video file is compressed before decoding, decoding is to restore a compressed video file to an original video file.

Wherein, a video file data output includes an audio output and a video output, a screen can be controlled for displaying by sending a decoded audio to an audio card and sending a decoded video to a video card, thus a playing process is completed.

In addition, because of an independent of audio and video after the de-multiplexing, a synchronization mechanism is needed to synchronize the video, and control speed, pause, stop, jump during playing the video file, and obtain various media information and set properties.

The synchronization mechanism is realized according to time axis of the video or the audio, by means of the synchronization mechanism, the synchronization of audio and video is completed by playing the video and the audio at the same time according to time information in the time axis.

Figure 3:
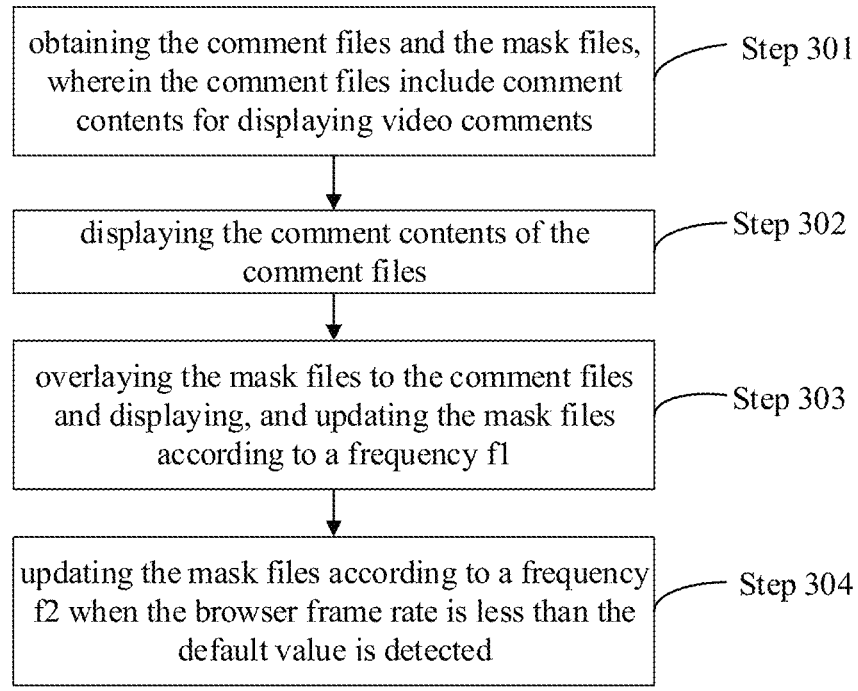
FIG. 3 is a flowchart of the method of displaying video comments based on the FIG. 2.

Specifically, as shown in FIG. 3, in this embodiment, the step S230: the displaying the comment files and the mask files specifically comprises:

Step S301: obtaining the comment files and the mask files, wherein the comment files include comment contents for displaying video comments;

Step S302: displaying the comment contents of the comment files; Step S303: overlaying the mask files to the comment files and displaying, and updating the mask files according to a frequency f1;

Correspondingly, the step S240: the reducing the update frequency of the mask files when the computer performance parameter is less than a default value is detected specifically comprising:

Step S304: updating the mask files according to a frequency f2 when the browser frame rate is less than the default value is detected, wherein f2<f1.

Because the video comments are played by each frame according to time axis information, in this embodiment, T1, T2, . . . Tn comment information in accordance with a sequence, that is the time axis, displaying the corresponding comment content at each time T in the time axis.

In this embodiment, the server divides the video uploaded by the user into frames, recognizes the boundary of each entity in a picture by applying an image instance segmentation algorithm to each frame, and finds out the main entity, records the boundaries of the main area of the picture in a form of dot matrix figure, and forms original data of comment mask.

The dot matrix figure generated in the previous step, the time information of this frame, and element information of the width and height of this frame are combined and compressed to form a specific file structure, and the file is stored in the server.

The client requests the mask files, decompresses and analyzes downloaded mask data, restores the mask data to the corresponding video time information and the dot matrix figure, stretches and enlarges them to fit the screen size, and then draws and displays on the screen after overlapping them with text comment content in the comment file.

Finally, according to video time axis information during playing video and the time axis information of comments, updating the mask files synchronously according to the frequency f1 to display the comments and the masks.

The mask files are updated according to the frequency f2 when it is detected that the browser frame rate is less than the default value, wherein f2<f1, that is reducing the update frequency of the mask files so as to reduce computer resource consumption.

There are many computer performance parameters in the process of detecting the rendering of the page data, such as memory usage, CPU usage and so on, in this embodiment, the computer performance parameter is the browser frame rate when rendering the page data, that is, the FPS (frames per second, frames per second) when the browser renders a page file.

There are many methods to detect the FPS, in this embodiment, a requestAnimationFrame method detection based on the browser is adopted.

The requestAnimationFrame sends a notification to the browser and requests the browser to update the page by calling a specified callback function before the next page rendering. By passing in a callback function as a parameter, the callback function is executed before the next rendering of the browser, which enable the browser to call the callback function before the next repainting. The number of executing the callback function is usually 60 times per second, and the number of executing the callback function usually matches the number of browser screen refreshes.

In most browsers, when requestAnimationFrame( ) runs in a background tab page or in a hidden <iframe>, FPS can be obtained by calling data of these tab pages.

Specifically, the requestAnimationFrame method is used by the operating system to determine execution time of the callback function, if a refresh rate of the screen is 60 Hz, then the callback function is executed every 16.7 ms, if the refresh rate is 75 Hz, the time interval becomes 1000/75=13.3 ms, wherein the refresh rate of the screen is a speed of image updating on the screen, that is, the number of images appearing on the screen per second, the step of the requestAnimationFrame runs as the step of the operating system refreshes.

Figure 4:
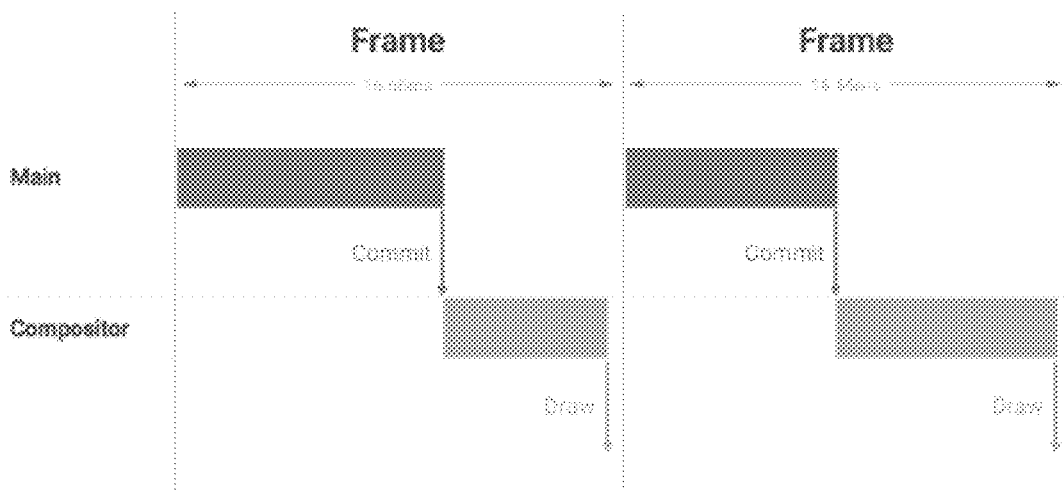
FIG. 4 is a first schematic diagram of a browser frame rate when rending page data is detected of the embodiment 1.
Figure 5:
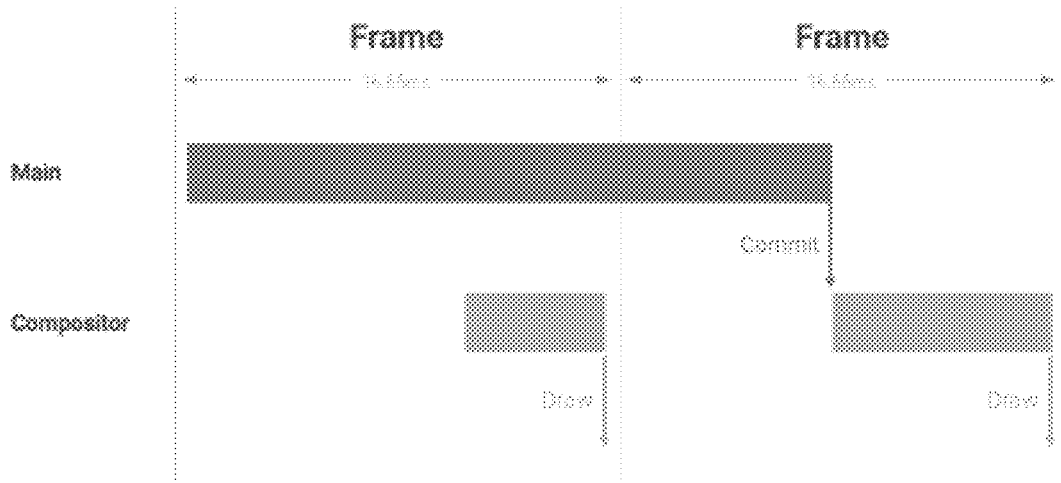
FIG. 5 is a second schematic diagram of the browser frame rate when rending the page data is detected of the embodiment 1.

As shown in FIG. 4 and FIG. 5, taking Chrome browser as an example, if a behavior that consumes more performance exists, the time consumption of a single frame (web frame) can be affected, and the FPS of current page decreasing at that time is caused, the time consumption of rendering current frame may become longer when encountering a behavior that consumes more performance in current page, thus resulting in the FPS reduction of the current page. Wherein main corresponds to a Main thread and compositor corresponds to a compositor thread, which are used for rendering web page contents.

Figure 6:
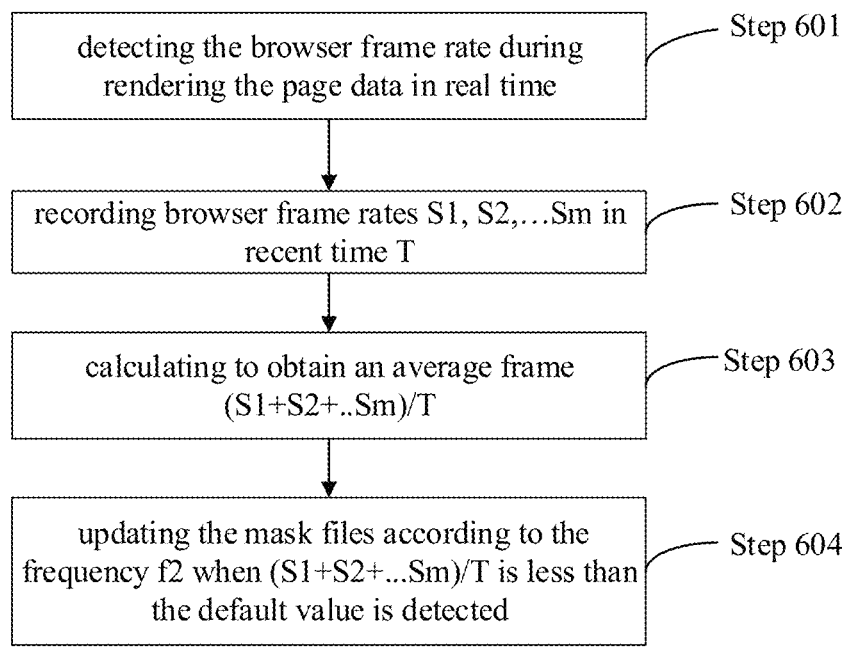
FIG. 6 is a flowchart of a computer performance parameter when rendering the page data is detected of the embodiment 1.

Specifically, as shown in FIG. 6, in this embodiment, the step S210: the detecting a computer performance parameter during rendering the page data specifically comprises:

Step S601: detecting the browser frame rate during rendering the page data in real time;

Step S602: recording browser frame rates S1, S2, . . . Sm in recent time T;

Step S603: calculating to obtain an average frame (S1+S2+ . . . Sm)/T;

Correspondingly, the step S304: the updating the mask files according to the frequency f2 when the browser frame rate is less than the default value is detected specifically comprising:

Step S604: updating the mask files according to the frequency f2 when (S1+S2+ . . . Sm)/T is less than the default value is detected.

At first, the player detects the FPS of current page in real time, and records it in a performance FPS list, and saves an FPS value of the latest T seconds. The player calculates an average FPS=(S1+S2+ . . . SM)/T of the last T seconds according to the performance FPS list per second.

If the average FPS changes, follow the next steps to reduce the update frequency of mask by setting the update frequency of mask, so as to reduce consumption of computer resources.

Figure 7:
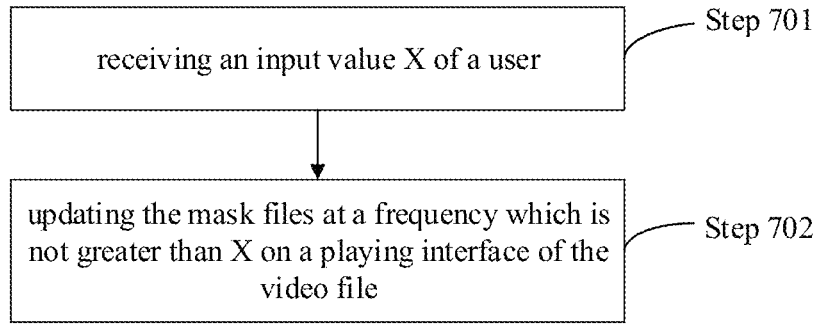
FIG. 7 is a flow chart of the method of displaying video comments based on the FIG. 6.

Specifically, as shown in FIG. 7, in this embodiment, the method further comprises:

Step S701: receiving an input value X of a user;

Correspondingly, the step S303: the updating the mask files according to the f1 specifically comprises:

Step S702: updating the mask files at a frequency which is not greater than X on a playing interface of the video file.

Figure 8:
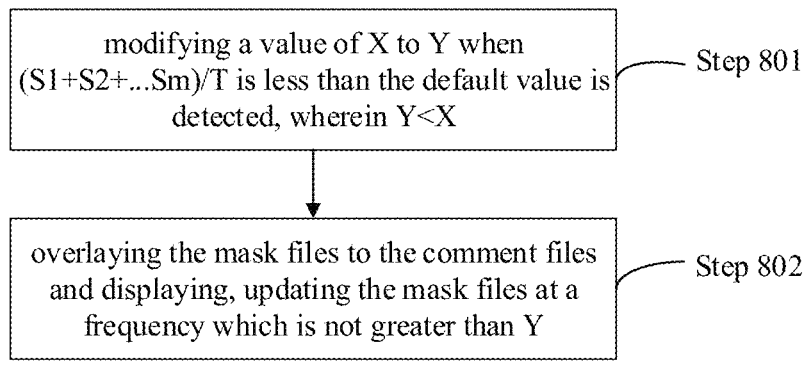
FIG. 8 is a flow chart of the method of displaying video comments based on the FIG. 7.

Specifically, as shown in FIG. 8, in this embodiment, the method further comprises:

Step S801: modifying a value of X to Y when (S1+S2+ . . . Sm)/T is less than the default value is detected, wherein Y<X;

Correspondingly, the step S303: overlaying the mask files to the comment files and displaying, and updating the mask files according to a frequency f1 specifically comprising:

Step S802: overlaying the mask files to the comment files and displaying, updating the mask files at a frequency which is not greater than Y.

Figure 9:
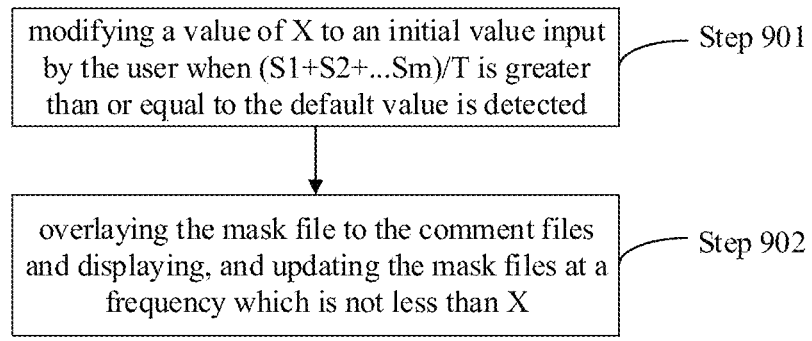
FIG. 9 is a flow chart of the method of displaying video comments based on the FIG. 8.

Specifically, as shown in FIG. 9, in this embodiment, the method further comprises: Step S901: modifying a value of X to an initial value input by the user when (S1+S2+ . . . Sm)/T is greater than or equal to the default value is detected;

Correspondingly, the step S303: overlaying the mask file to the comment files and displaying, and updating the mask files according to frequency f1 specifically comprising:

Step S902: overlaying the mask file to the comment files and displaying, and updating the mask files at a frequency which is not less than X.

In this embodiment, the update frequency X of multiple different mask files is set by the user customarily, after a current mask update frequency reaches the value set by the user, the mask files are updated at a frequency which is less than X on the playing interface of the video file, as shown in Table 1.

TABLE 1

| attribute name | FPS | mask update frequency |
|---|---|---|
| HIGH_PERF | ≥40 | 8 |
| MEDIUM_PERF | <40 and ≥20 | 4 |
| LOW_PERF | <20 | 2 |

For example, when a user opens a player on page A for viewing, a default setting for each new page player is HIGH_PERF, and a default mask update frequency is set to 6, that is, up to 6 frames of mask files are updated per second, the FPS remains stably at about 60. At this time, when various occupancy performance calculations or rendering appear in a page:

If the page A detects a current average FPS is 20≤FPS<40 in the latest 5 second, reduces the mask update frequency to 4, that is, up to 4 mask files per second are updated, stops updating and obtaining the mask files when the mask files reaches 4 frames per second. If the average FPS of the page A is greater than or equal to 40 after 5 seconds, the mask update frequency in a current player is set back to 6 which is set by the user to ensure normal viewing.

In an embodiment of the present application, it is realized by modifying the input value x of the user to y, wherein there is a coefficient relationship between Y and X, that is, the attenuation multiple of the mask update frequency set by the user, every time when the FPS is lower than a preset value, attenuating a certain multiple, for example, if the page A detects that the current average FPS≤40 in latest 5 seconds, the mask update frequency in current player is set to one-half of the value set by the user automatically, if the page A detects that the current average FPS≤20 in latest 5 seconds, the mask update frequency in current player is set to a quarter of the value set by the user automatically.

In other embodiments of the present application, when it is detected that the FPS is less than the preset value and a new mask update frequency needs to be set, a new input Y of the user can also be received again, as long as y<x, the mask update frequency can be reduced to cut down the consumption of computer resources.

Figure 10:
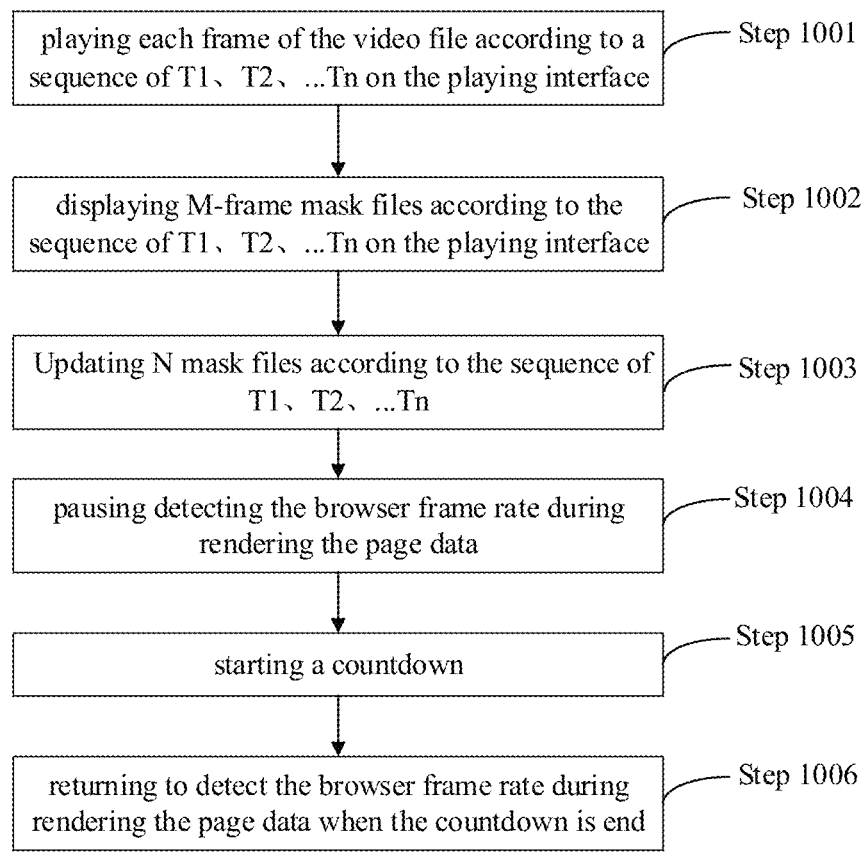
FIG. 10 is a flow chart of the method of displaying video comments based on the FIG. 9.

Specifically, as shown in FIG. 10, in this embodiment, the method further comprises:

Step S1001: playing each frame of the video file according to a sequence of T1, T2, . . . Tn on the playing interface;

Correspondingly, the step S303: overlaying the mask files to the comment files and displaying, and updating the mask files according to the frequency f1 comprising:

Step S1002: displaying M-frame mask files according to the sequence of T1, T2, . . . Tn on the playing interface, wherein f1=M/(Tn−T1+1); Correspondingly, the step S304: updating the mask files according to the frequency f2 when the browser frame rate is less than the default value is detected comprising:

Step S1003: Updating N mask files according to the sequence of T1, T2, . . . Tn, wherein M>N.

By playing each frame of the video file in the sequence of T1, T2, . . . Tn on the playing interface and displaying M-frame mask files in the sequence of T1, T2, . . . Tn on the playing interface, the time axis of video file and the mask files can be synchronized, so that the video file, the comment contents of the comment files and each frame mask file can be synchronized in time, it is formed by rendering specific entity boundary information generated by analyzing pictures of the video file through the mask files according to a principle of anti-covering comment, therefore, display information of the mask files needs to be synchronized with the time information of displaying the corresponding entity in the video file, so as to realize displaying corresponding anti-covering comment at the specific time node during playing the video, wherein the comment shown here is input by other users and sent to the server at this node during playing the video, which contains time node information of playing the video file, and then it is displayed when the video is played at the time node when the user obtains comment files.

Only the number of updating the mask files within the preset time T1, T2, . . . Tn should be reduced when it is necessary to reduce the mask update frequency, that is to say, updating N mask files according to the sequence of T1, T2, . . . Tn, and M>n.

After the step S801: modifying the value of X to Y when (S1+S2+ . . . Sm)/T is less than the default value is detected, further comprising:

Step S1004: pausing detecting the browser frame rate during rendering the page data;

Step S1005: starting a countdown;

Step S1006: returning to detect the browser frame rate during rendering the page data when the countdown is end.

In this embodiment, each dynamic adjustment has cooling time, for example, a dynamic adjustment is only allowed once within 5 s by default, after the value of X is modified to y, the browser frame rate can be paused detecting during rendering the page data, and starting a 5-second countdown, or setting a 5-second trigger time, when the countdown is end or reaches the preset time, the browser frame rate is returned to detect and the comment density is adjusted.

The method of playing video comments provided by the present application through detecting a computer performance parameter during rendering the page data, stopping displaying new comments when the computer performance parameter is less than the preset value during rendering the page data, and the display density of comments can be adjusted according to the computer performance status, so as to optimize the display process of comments and improve the stability of comment display.

Figures 11, 12:
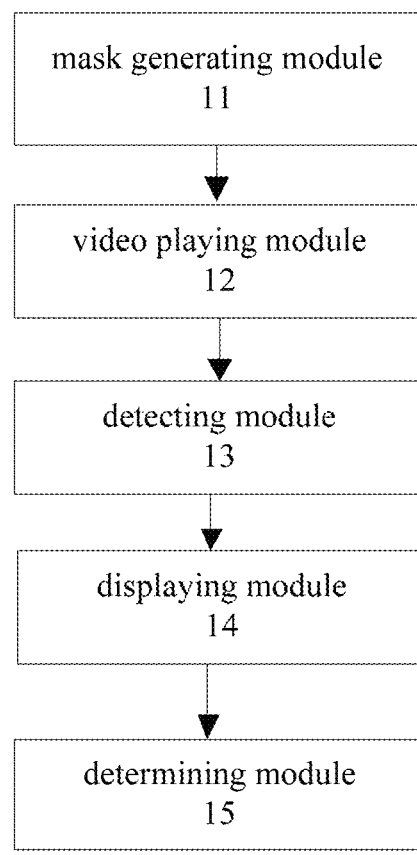
FIG. 11 is a flow chart of a method of displaying video comments of the embodiment 1.
FIG. 12 is a block diagram of a device of displaying video comments of an embodiment 2.

Specifically, as shown in FIG. 11, in this embodiment, the method further comprises:

Step S1101: stopping displaying comment contents after time Tx when (S1+S2+ . . . Sm)/T is less than the default value is detected, wherein 1≤x<n.

The method of displaying video comments provided by the present application through detecting a computer performance parameter during rendering the page data, reduces update frequency of the mask files when the computer performance parameter is less than a default value is detected, it can optimize comment display process according to the computer performance status, and improve stability of an anti-covering comment display.

Embodiment 2

The embodiment provides a device of displaying video comments based on the method of displaying video comments in the embodiment 1, specifically, FIG. 12 illustrates a block diagram of a device of displaying video comments, which is divided into one or more program modules, the one or more program modules are stored in a storage medium and executed by one or more processors to complete the application. The program module as reference in the application is a series of computer-readable instruction segments which are capable of completing specific functions, and more suitable than the program itself to describe the execution process of the device of displaying video comments in the storage medium. The following description will specifically introduce the functions of each program module in the embodiment.

As shown in FIG. 12, the device of displaying video comments includes the following components:

a mask generating module 11, dividing a video file into multiple frames, and generating a mask file corresponding to each frame;

a video play module 12, obtaining page data including the video file, and rendering the page data to play contents of the video file;

a detecting module 13, detecting a computer performance parameter during rendering the page data;

a displaying module 14, displaying comment files and mask files, wherein the mask files are updated according to playing contents of the video file;

a determining module 15, reducing an update frequency of the mask files when the computer performance parameter is less than a default value is detected.

Figure 13:
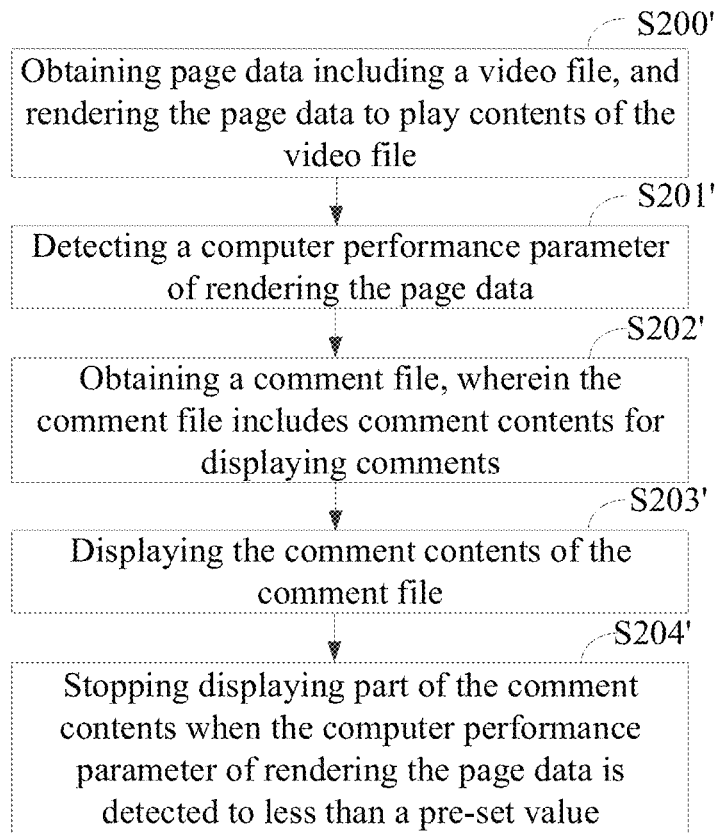
FIG. 13 illustrates an optional flowchart of the method for comment displaying provided in the first embodiment.

Referring to FIG. 13, which is a schematic flowchart of a method for comment displaying in accordance with a preferred embodiment of the present invention. As can be seen from the figure, the method for comment displaying provided in the embodiment mainly includes the following steps:

Step S200': obtaining page data including a video file, and rendering the page data to play contents of the video file.

Step S201': detecting a computer performance parameter of rendering the page data;

Step S202': obtaining a comment file, wherein the comment file includes comment contents for displaying comments.

Step S203': displaying the comment contents of the comment file.

Step S204': stopping displaying part of the comment contents when the computer performance parameter of rendering the page data is detected to less than a pre-set value.

Wherein, the video file is included in the page data of a web page. After the client obtains the page data from the server, the page data is parsed according to protocols supported by the browser, and then the page data is rendered to play the contents of the video file.

For the video file, when the video file is parsed out for rendering and playing, a playing process at least includes the video file data receiving, parsing, decoding and outputting processes.

Wherein, the video file data receiving is receiving, obtaining, and getting video file data streams sent from data source. There can be multiple sources of data sources, such as a hard disk or external storage device of an intelligent terminal, or a server connected through a network. The interface of different data sources is unified, and the video file is obtained to a player for processing through different protocols and data parsers.

Wherein, the video file data parsing is also called demultiplexing, which is to separate the combine audio and video. The video is independently encoded during production, and obtained data is separate, for the convenience of transmission, it will be combined in a certain way, that is, corresponding to different packaging formats. The demultiplexing is to decompose the audio and video streams sent to an audio decoder and a video decoder respectively, to perform a decoding operation.

Wherein, the video file data decoding includes audio and video decoding. In order to facilitate transmission, the video file is compressed before decoding. The decoding is to restore the compressed video file to an original video file.

Wherein, the video file data outputting includes audio and video outputting. The playing process is completed by sending a decoded audio to a sound card and sending a decoded video to a video card control screen for displaying.

In addition, since the audio and the video are independent after demultiplexing, a synchronization mechanism is needed to synchronize the video, and control speed, pause, stop, jump and obtain various media information and set properties and so on when playing the video file.

The synchronization mechanism is realized by time axis of the audio or the video. The synchronization mechanism completes the synchronization of the audio and the video by playing video and audio simultaneously at the same time according to time information in time axis information.

Figure 14:
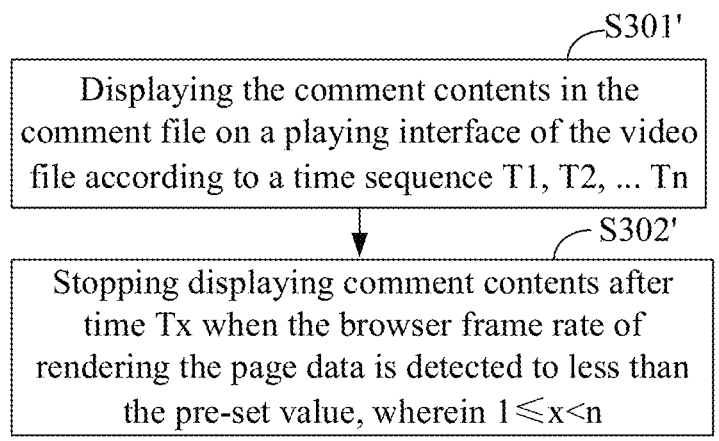
FIG. 14 illustrates an optional flowchart of the method for comment displaying based on the FIG. 13.

Specifically, as shown in FIG. 14, in the embodiment, Step S230: displaying the comment contents of the comment file includes:

Step S301': displaying the comment contents in the comment file on a playing interface of the video file according to a time sequence T1, T2, . . . Tn.

Correspondingly, the step S240: stopping displaying part of the comment contents when the computer performance parameter of rendering the page data is detected to less than a pre-set value, specifically includes:

Step S302': stopping displaying comment contents after time Tx when the browser frame rate when rendering the page data is detected to less than the pre-set value, wherein $1 \leq x < n$.

Because the comment is played by each frame according to the time axis information, in the embodiment, the time series T1, T2, . . . Tn comment, that is, the time axis, a corresponding comment contents at each time T in the time axis is displayed.

The stopping displaying comment contents after time Tx when the browser frame rate when rendering the page data is detected to less than the pre-set value, that is, part of the comment contents inserted after the time Tx is stopped to reduce the consumption of computer resources.

There are various computer performance parameters when detecting the rendering page data, such as memory usage, CPU usage, etc. In the embodiment, the computer performance parameter is a browser frame rate when rendering the page data, that is, the FPS (Frames Per Second) when the browser renders the page file.

There are various methods to detect the FPS. In the embodiment, a requestAnimationFrame method based browser is used.

The requestAnimationFrame sends a notification to the browser and requires the browser to call a specified callback function to update the page before rendering the page next time. By introducing a callback function as a parameter, the callback function will be executed before next rendering of the browser, which will cause the browser to call the callback function before next redraw. The number of callback function executions is usually 60 times per second, and the number of callback function executions usually matches the number of browser screen refreshes.

In most browsers, when requestAnimationFrame ( ) runs in the background tab or hidden <iframe>, the FPS can be obtained by calling data of these tabs.

Specifically, the requestanimationframe method is determined by an operating system to determine execution time of the callback function. If a screen refresh rate is 60 Hz, then the callback function is executed every 16.7 ms. If a refresh rate is 75 Hz, a time interval becomes 1000/75=13.3 ms. The screen refresh rate is the speed of image updating on the screen, that is, a number of images appearing on the screen per second, and the pace of requestAnimationFrame runs with the refreshing pace of the system.

Figure 15:
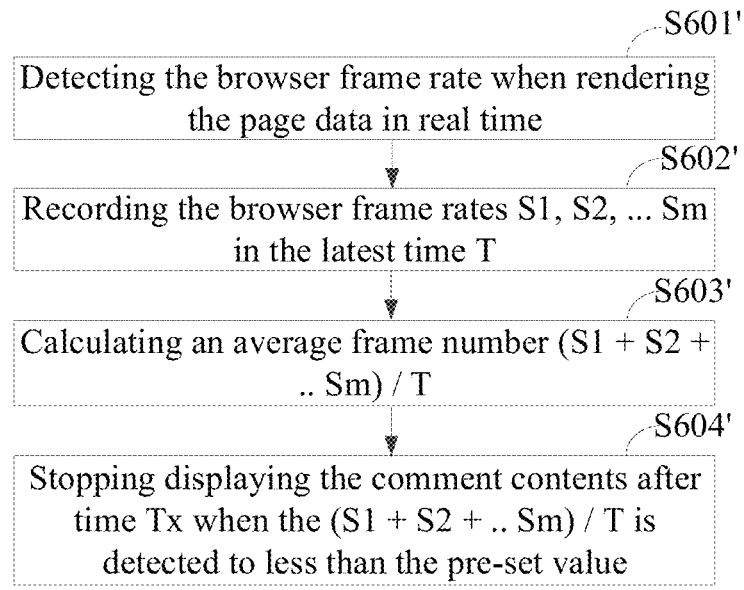
FIG. 15 illustrates an optional flowchart of detecting a computer performance parameter of rendering the page data in the first embodiment.

As shown in FIG. 15, in the embodiment, the Step S210': detecting a computer performance parameter of rendering the page data, includes the following steps:

Step S601': detecting the browser frame rate when rendering the page data in real time.

Step S602': recording the browser frame rates S1, S2, . . . Sm in the latest time T.

Step S603': calculating an average frame number (S1+ S2+ . . . Sm)/T.

Correspondingly, the stopping displaying comment contents after time Tx when the browser frame rate when rendering the page data is detected to less than the pre-set value, specifically includes:

step S604': stopping displaying the comment contents after time Tx when the (S1+S2+ . . . Sm)/T is detected to less than the pre-set value.

First, a player will detect current page FPS in real time, and record it in a performance list FPSList, then save FPS value of the latest T seconds. The average FPS=(S1+ S2+ . . . SM)/T in the last T seconds is calculated per second according to the saved performance list FPSList by the player.

If the average FPS is changed, follow the next steps to stop displaying the time part of the comment contents by setting the relevant bullet density, so as to reduce the consumption of computer resources. In addition, when a screen density is adjusted automatically, the comment displayed on the playback screen will not be affected.

Figure 16:
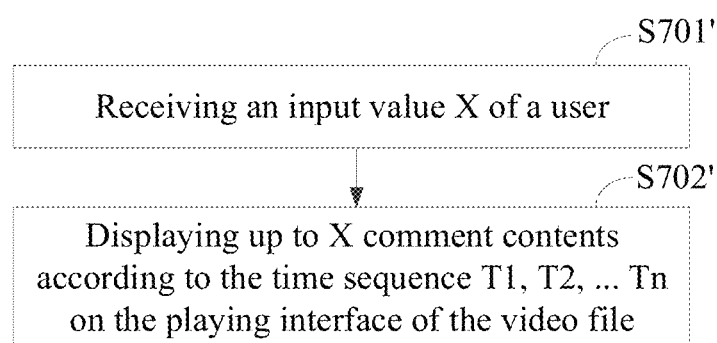
FIG. 16 illustrates an optional flowchart of the method for comment displaying based on the FIG. 6.

Specifically, as shown in FIG. 16, in the embodiment, the following steps are also included:

Step S701': receiving an input value X of a user.

Correspondingly, the Step S301: displaying the comment contents in the comment file on a playing interface of the video file according to a time sequence T1, T2, . . . Tn, specifically includes:

Step S702': displaying up to X comment contents according to the time sequence T1, T2, . . . Tn on the playing interface of the video file.

Figure 17:
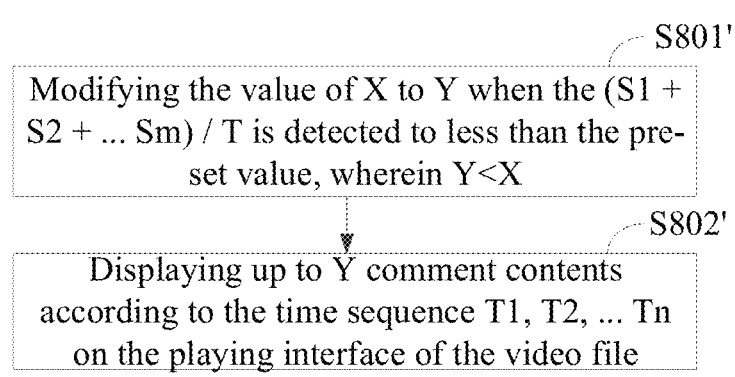
FIG. 17 illustrates an optional flowchart of the method for comment displaying based on the FIG. 7.

Specifically, as shown in FIG. 17, in the embodiment, the following steps are also included:

Step S801': modifying the value of X to Y when the (S1+S2+ . . . Sm)/T is detected to less than the pre-set value, wherein Y<X.

Correspondingly, the step S301: displaying the comment contents in the comment file according to a time sequence T1, T2, . . . Tn, specifically includes:

Step S802': displaying up to Y comment contents according to the time sequence T1, T2, . . . Tn on the playing interface of the video file.

Figure 18:
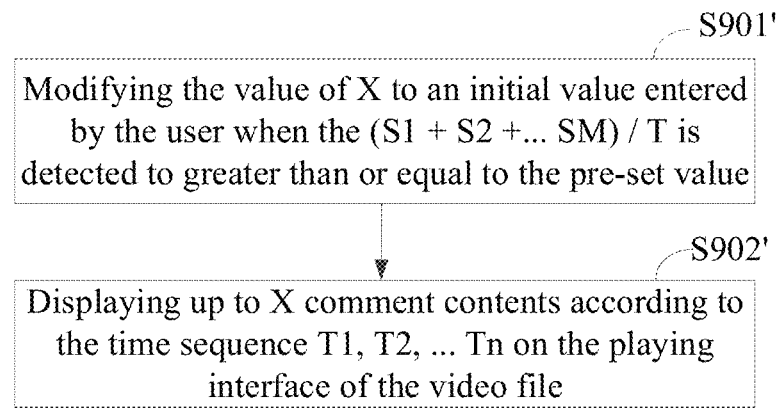
FIG. 18 illustrates an optional flowchart of the method for comment displaying based on the FIG. 8.

Specifically, as shown in FIG. 18, in the embodiment, the following steps are also included:

Step S901': modifying the value of X to an initial value entered by the user when the (S1+S2+ . . . SM)/T is detected to greater than or equal to the pre-set value.

Correspondingly, the Step S301: displaying the comment contents in the comment file on a playing interface of the video file according to a sequence T1, T2, . . . Tn, specifically includes:

Step S902': displaying up to X comment contents according to the time sequence T1, T2, . . . Tn on the playing interface of the video file.

In the embodiment, the display density X of multiple different comments are set by user's customization, that is, the maximum number of comment displayed on a video playing interface. When the number of comments currently displayed reaches the number set by the user, the playing interface of video file display up to X comment contents according to the time sequence T1, T2, . . . TN, and no part of comment contents will be displayed, as shown in Table 1.

TABLE 1

| attribute name | FPS | comment density |
| --- | --- | --- |
| HIGH_PERF | ≥40 | 80 |
| MEDIUM_PERF | <40 且 ≥20 | 40 |
| LOW_PERF | <20 | 20 |

For example, when the user opens the player to watch, a default setting of each new page in the player is HIGH_PERF, a default comment density is set to 80, and a FPS is remained stable at about 60. At this time, when various occupancy performance calculations or rendering appear in the page:

If a page A detects that an average FPS within the current 5 S is 20≤FPS<40, the comment density will be automatically set in a current player to one-half of the user's setting, that is, the maximum comment density is 40.

If the average FPS of the page A after 5 S is ≥40, the comment density in the current player will be set back to the value set by the user to ensure normal viewing.

In the embodiment of the present invention, the user input the value X is modified to Y, and there is a coefficient relationship between Y and X. That is, an attenuation factor of the comment density is set by the user to realize that each time when the FPS is lower than the pre-set value, decays a certain multiple, for example, if the page A detects the average FPS within the current 5 S is ≤40 the comment density in the current player will be automatically set to one-half set by the user. If the page A detects that the average FPS in the current 5 S is ≤20, the comment density in the current player will be automatically set to one-quarter set by the user.

In other embodiments of the present invention, when the FPS is detected to be less than the pre-set value and part of the bullet content density needs to be set, the new input Y by the user can also be received again. As long as Y<X, the comment density can be reduced to reduce the consumption of computer resources. In addition, when the comment density is adjusted automatically, the displayed comment on the player will not be affected.

Figure 19:
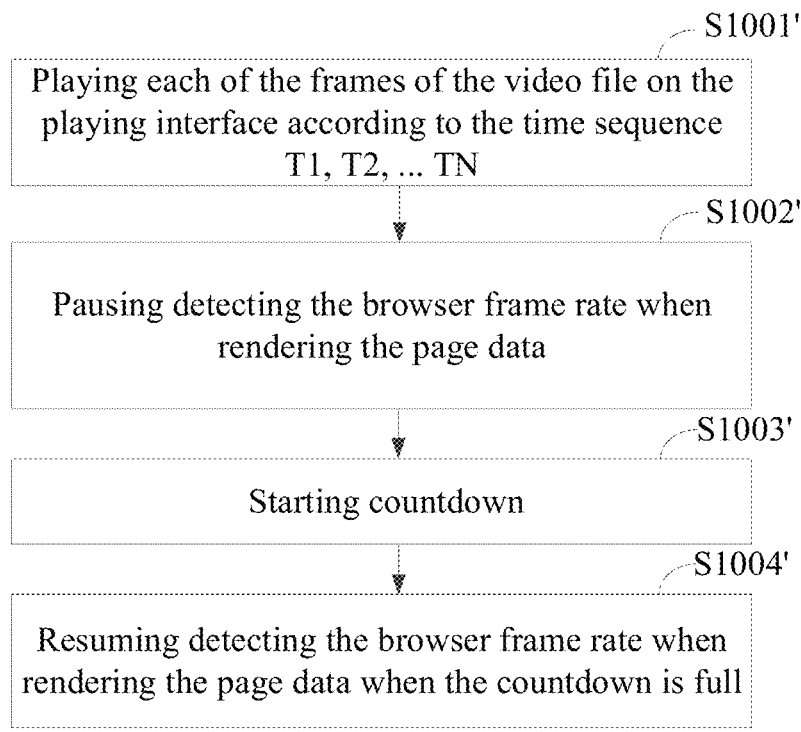
FIG. 19 illustrates an optional flowchart of the method for comment displaying based on the FIG. 9.

Specifically, as shown in FIG. 19, in the embodiment, the following steps are also included:

Step S1001': playing each of the frames of the video file on the playing interface according to the time sequence T1, T2, . . . TN.

The time axis can be synchronized by playing each of the frames of the video file on the playing interface according to the time sequence T1, T2, . . . TN, so that time of playing the video file and displaying the comment contents in the bullet file can be synchronized, thus the corresponding comment is displayed at a specific time node when playing the video. Wherein the comment is input and sent to the server by other users at the node when playing the video, including the time node information when playing the video file, and then the comment file obtained by the user is displayed when the video is played to the time node.

After the step S801': modifying the value of X to Y when (S1+S2+ . . . Sm)/T is detected to less than the pre-set value, further including:

Step S1002': pausing detecting the browser frame rate when rendering the page data.

Step S1003': starting countdown.

Step S1004': resuming detecting the browser frame rate when rendering the page data when the countdown is full.

In the embodiment, each dynamic adjustment has a cooling time. For example, by default, only one dynamic adjustment is allowed within 5 S, the browser frame rate when rendering the page data can be suspended after the value of X is modified to Y, and a 5-second countdown can be started, or a 5-second trigger time can be set. When the countdown is full or when the pre-set time is reached, the browser frame rate of detection can be resumed and the comment density can be adjusted.

The method for comment displaying provided by the present application can stop displaying part of the comment contents when the computer performance parameter of rendering the page data is detected to less than a pre-set value by detecting computer performance parameters when rendering the page data, which can adjust the comment display density according to the computer performance, to optimize the comment display process and improve the comment display stability.

Embodiment 2

Figure 20:
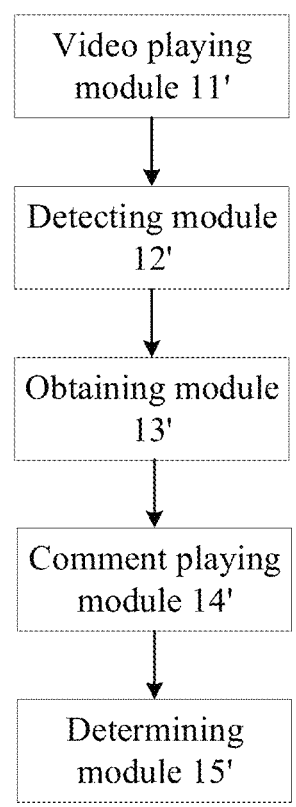
FIG. 20 illustrates a schematic diagram of an optional program module of a device for comment displaying provided in a second embodiment.

Based on the method for comment displaying provided in the above embodiment, the embodiment provides a device for comment displaying. Specifically, FIG. 20 illustrates an optional structure diagram of the device for comment displaying. The device for comment displaying is divided into one or more program modules, which are stored in a medium, and executed by one or more processors to implement present invention. The program module referred to in the embodiment of the present invention refers to a series of computer program instruction segments capable of accomplishing specific functions, and is more suitable for describing execution process of device for comment displaying in the medium than the program itself. The following description will specifically describe the functions of the program modules of the embodiment.

As shown in the FIG. 20, the device for comment displaying includes the following components: a video playing module 11', obtaining page data including a video file, and rendering the page data to play contents of the video file; a detecting module 12', detecting a computer performance parameter of rendering the page data; an obtaining module 13', obtaining a comment file, wherein the comment file includes comment contents for displaying comments; a comment playing module 14', displaying the comment contents of the comment file; a determining module 15', stopping displaying part of the comment contents when the computer performance parameter of rendering the page data is detected to less than a pre-set value.

Figure 21:
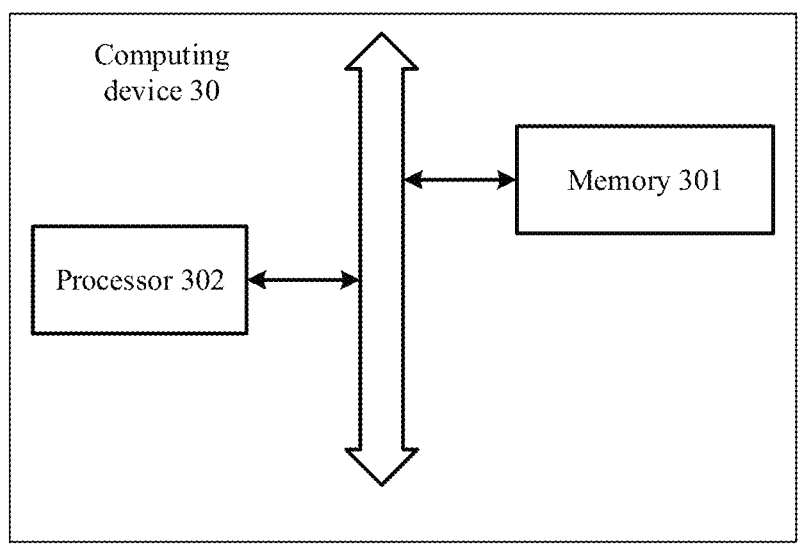
FIG. 21 is a diagram of hardware architecture of a computing device of an embodiment 3.

This disclosure also provides a computing device, for example, such as the computing device can be a smartphone, tablet, laptop, desktop computer, rack server, blade server, tower server, or cabinet server (including stand-alone servers, or a cluster of multiple servers), and so on. As shown in FIG. 21, the computing device 30 in the embodiment includes, but is not limited to, a memory 301 and a processor 302 that can communicate with each other through a system bus. It should be noted that FIG. 21 only shows the computing device 30 with components 301-302, but it should be understood that not all the components shown are required to be implemented, and more or less components can be implemented instead.

In the embodiment, the memory 301 (that is a readable storage medium) includes a flash memory, a hard disk, a multimedia card, a card type memory (e.g., SD or DX memory, etc.), a random access memory (RAM), a static random access memory (SRAM), a read-only memory (ROM), electrically erasable programmable read-only memory (EEPROM), programmable read-only memory (PROM), magnetic memory, magnetic disk, optical disk, etc. In some embodiments, the memory 301 may be an internal storage module of the computing device 30 such as the hard disk or memory of the computing device 30. In other embodiments, the memory 301 may also be an external storage device of the computing device 30, such as a plugged hard disk provided on the computing device 30, a smart media card (SMC), a secure digital (SD) card, a flash memory card, and the like. Of course, the memory 301 may also include both an internal storage module of the computing device 30 and an external storage device. In the embodiment, the memory 301 is generally used to store an operating system and various types of application software installed in the computing device 30, such as program codes of a device of displaying video comments in the embodiment 2 and the like. In addition, the memory 301 may also be used to temporarily store various types of data that have been or will be output.

The processor 302, in some embodiments, may be a Central Processing Unit (CPU), a controller, a microprocessor, or other data processing chips. The processor 302 is generally used to control the overall operation of the computing device 30.

Specifically, in the embodiment, the processor 302 is used to execute the program stored in the processor 302 of the method of displaying the video comments, wherein the method of displaying the video comments is executed for implementing the following steps:

dividing a video file into multiple frames, and generating a mask file corresponding to each frame;

obtaining page data including the video file, and rendering the page data to play contents of the video file;

detecting a computer performance parameter during rendering the page data;

displaying comment files and mask files, wherein the mask files are updated according to playing contents of the video file;

reducing a frequency of updating mask frames or reducing a density of displaying comments when the computer performance parameter is less than a default value is detected.

This disclosure also provides a computer-readable storage, which includes a flash memory, a hard disk, a multimedia card, a card type memory (such as SD or DX memory, etc.), a random access memory (RAM), a static random access memory (SRAM), a read-only memory (ROM), electrically erasable programmable read-only memory (EEPROM), programmable read-only memory (PROM), magnetic memory, magnetic disk, optical disk, servers, app store, and so on, a computer-readable instruction is stored on it, and the following steps are realized when the computer-readable instruction is executed by the processor.

dividing a video file into multiple frames, and generating a mask file corresponding to each frame;

obtaining page data including the video file, and rendering the page data to play contents of the video file;

detecting a computer performance parameter during rendering the page data;

displaying comment files and mask files, wherein the mask files are updated according to playing contents of the video file;

reducing an update frequency of the mask files when the computer performance parameter is less than a default value is detected.

The specific embodiment process of the above method steps can be seen in the embodiment 1, which will not be repeated here.

The method and device of displaying video comments, computing device, and readable storage medium provided by the present application.

It should be noted that, in this article, the terms "including", "including" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "including a . . . " does not exclude that there are other identical elements in the process, method, article, or device that includes the element.

The above-mentioned serial numbers of the embodiments of the present application are merely for description, and do not represent the superiority or inferiority of the embodiments.

Through the description of the above embodiments, those skilled in the art can clearly understand that the methods in the above embodiments can be implemented by means of software plus a necessary general hardware platform, and of course, can also be implemented by hardware, but in many cases the former is better Implementation.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of displaying comments relative to video frames while playing a video, comprising:

obtaining page data comprising a video file and rendering the page data to play a video, the video comprising a plurality of frames;

obtaining a comment file comprising a plurality of comments on the video;

displaying the plurality of comments relative to the plurality of frames while playing the video, wherein the displaying the plurality of comments further comprises displaying the plurality of comments according to a time sequence T1, T2, . . . Tn;

detecting a computer performance parameter during rendering the page data, wherein the computer performance parameter is a browser frame rate; and reducing a density of displaying comments in response to determining that the computer performance parameter is less than a predetermined value, wherein the reducing the density of displaying comments further comprises stopping displaying comments after a time Tx in response to determining that the computer performance parameter is less than the predetermined value, and wherein $1 \leq x < n$.

2. The method of claim 1, further comprising:

detecting the browser frame rate during rendering the page data in real time;

recording a plurality of browser frame rates S1, S2, . . . Sm in a recent period of time T;

determining an average browser frame rate, wherein the average browser rate equals to (S1+S2+ . . . Sm)/T; and determining whether the average browser frame is less than the predetermined value.

3. The method of claim 1, further comprising:

displaying the plurality of comments according to a time sequence T1, T2, . . . Tn;

receiving a value X from a user;

displaying up to X comments according to the time sequence T1, T2, . . . Tn;

modifying the value from X to Y in response to determining that the computer performance parameter is less than the predetermined value, wherein Y<X; and displaying up to Y comments according to the time sequence T1, T2, . . . Tn.

4. The method of claim 3, after modifying the value from X to Y in response to determining that the computer performance parameter is less than the predetermined value, further comprising:

pausing detecting the computer performance parameter when rendering the page data;

starting a countdown timer;

resuming detecting the computer performance parameter when the countdown timer expires.

5. The method of claim 1, further comprising:

obtaining a mask file corresponding to the video, wherein the mask file comprises a plurality of mask frames corresponding to the plurality of frames of the video, and each of the plurality of mask frames comprises a mask area corresponding to a main area of a corresponding frame of the video;

displaying one or more comments in areas other than a mask area of a corresponding mask frame; and reducing a frequency of updating mask frames in response to determining that the computer performance parameter is less than the predetermined value.

6. The method of claim 5, further comprising:

receiving a second value X';

updating mask frames at a first frequency that is not greater than X';

modifying the second value from X' to Y' in response to determining that the computer performance parameter is less than the predetermined value, wherein Y'<X'; and updating mask frames at a second frequency that is not greater than Y'.

7. The method of claim 6, after modifying the second value from X' to Y' in response to determining that the computer performance parameter is less than the predetermined value, further comprising:
pausing detecting the computer performance parameter when rendering the page data;
starting a countdown timer;
resuming detecting the computer performance parameter when the countdown timer expires.

8. The method of claim 7, further comprising:
modifying the second value from Y' to X' in response to determining that the computer performance parameter is equal to or greater than the predetermined value; and
updating mask files at the first frequency that is not greater than X'.

9. A system of displaying comments relative to video frames while playing a video, comprising:
at least one processor; and
at least one memory communicatively coupled to the at least one processor and storing instructions that upon execution by the at least one processor cause the system to:
obtain page data comprising a video file and rendering the page data to play a video, the video comprising a plurality of frames;
obtain a comment file comprising a plurality of comments on the video;
display the plurality of comments relative to the plurality of frames while playing the video, wherein displaying the plurality of comments further comprises displaying the plurality of comments according to a time sequence T1, T2, . . . Tn;
detect a computer performance parameter during rendering the page data, wherein the computer performance parameter is a browser frame rate; and
reduce a density of displaying comments in response to determining that the computer performance parameter is less than a predetermined value, wherein reducing the density of displaying comments further comprises stopping displaying comments after a time Tx in response to determining that the computer performance parameter is less than the predetermined value, and wherein $1 \leq x < n$.

10. The system of claim 9, the at least one memory further storing instructions that upon execution by the at least one processor cause the system to:
detect the browser frame rate during rendering the page data in real time;
record a plurality of browser frame rates S1, S2, . . . Sm in a recent period of time T;
determine an average browser frame rate, wherein the average browser rate equals to (S1+S2+ . . . Sm)/T; and
determine whether the average browser frame is less than the predetermined value.

11. The system of claim 9, the at least one memory further storing instructions that upon execution by the at least one processor cause the system to:
display the plurality of comments according to a time sequence T1, T2, . . . Tn;
receive a value X from a user;
display up to X comments according to the time sequence T1, T2, . . . Tn;
modify the value from X to Y in response to determining that the computer performance parameter is less than the predetermined value, wherein Y<X; and display up to Y comments according to the time sequence T1, T2, . . . Tn.

12. The system of claim 9, the at least one memory further storing instructions that upon execution by the at least one processor cause the system to:
obtain a mask file corresponding to the video, wherein the mask file comprises a plurality of mask frames corresponding to the plurality of frames of the video, and each of the plurality of mask frames comprises a mask area corresponding to a main area of a corresponding frame of the video;
display one or more comments in areas other than a mask area of a corresponding mask frame; and
reduce a frequency of updating mask frames in response to determining that the computer performance parameter is less than the predetermined value.

13. The system of claim 12, the at least one memory further storing instructions that upon execution by the at least one processor cause the system to:
receive a second value X';
update mask frames at a first frequency that is not greater than X';
modify the second value from X' to Y' in response to determining that the computer performance parameter is less than the predetermined value, wherein Y'<X'; and
update mask frames at a second frequency that is not greater than Y'.

14. The system of claim 13, the at least one memory further storing instructions that upon execution by the at least one processor cause the system to:
modify the second value from Y' to X' in response to determining that the computer performance parameter is equal to or greater than the predetermined value; and
update mask files at the first frequency that is not greater than X'.

15. A non-transitory computer-readable storage medium bearing computer-readable instructions that upon execution on a computing device cause the computing device at least to:
obtain page data comprising a video file and rendering the page data to play a video, the video comprising a plurality of frames;
obtain a comment file comprising a plurality of comments on the video;
display the plurality of comments relative to the plurality of frames while playing the video, wherein displaying the plurality of comments further comprises displaying the plurality of comments according to a time sequence T1, T2, . . . Tn;
detect a computer performance parameter during rendering the page data, wherein the computer performance parameter is a browser frame rate; and
reduce a density of displaying comments in response to determining that the computer performance parameter is less than a predetermined value, wherein reducing the density of displaying comments further comprises stopping displaying comments after a time Tx in response to determining that the computer performance parameter is less than the predetermined value, and wherein $1 \leq x < n$.

16. The non-transitory computer-readable storage medium of claim 15, further comprising computer-readable instructions that upon execution on the computing device cause the computing device at least to:
detect the browser frame rate during rendering the page data in real time;

record a plurality of browser frame rates S1, S2, ... Sm in a recent period of time T;
determine an average browser frame rate, wherein the average browser rate equals to (S1+S2+ ... Sm)/T; and
determine whether the average browser frame is less than the predetermined value.

* * * * *